US 9,915,566 B2

(12) United States Patent
Ni et al.

(10) Patent No.: US 9,915,566 B2
(45) Date of Patent: Mar. 13, 2018

(54) SMART LOOKDOWN FUNCTION SWITCH DESIGN FOR INTRUSION DETECTORS

(71) Applicant: Honeywell International Inc., Morristown, NJ (US)

(72) Inventors: Yutao Ni, Shenzhen (CN); Lei Qin, Shenzhen (CN); Haidong Xu, Shenzhen (CN)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 72 days.

(21) Appl. No.: 14/613,925

(22) Filed: Feb. 4, 2015

(65) Prior Publication Data
US 2016/0223403 A1 Aug. 4, 2016

(51) Int. Cl.
*G01J 5/08* (2006.01)
*G01J 5/00* (2006.01)
*G01J 5/34* (2006.01)
*G08B 13/19* (2006.01)
*G08B 13/191* (2006.01)
*G08B 13/193* (2006.01)

(52) U.S. Cl.
CPC .......... *G01J 5/0875* (2013.01); *G01J 5/0025* (2013.01); *G01J 5/0806* (2013.01); *G01J 5/34* (2013.01); *G08B 13/191* (2013.01); *G08B 13/193* (2013.01)

(58) Field of Classification Search
CPC .......... G01J 5/0025; G01J 5/0806; G01J 5/34; G01J 5/0875
USPC ......... 250/338.3, 342, 338.1, DIG. 1, 339.14
See application file for complete search history.

(56) References Cited

U.S. PATENT DOCUMENTS

| | | | | |
|---|---|---|---|---|
| 4,275,303 A | * | 6/1981 | Mudge .................. | G08B 13/19 250/342 |
| 5,818,337 A | * | 10/1998 | Erismann ............. | G08B 13/191 250/340 |
| 6,987,267 B1 | * | 1/2006 | Monroe .................... | G01J 5/04 250/342 |

(Continued)

OTHER PUBLICATIONS

Extended European search report from corresponding EP patent application 16153546.3, dated Jun. 2, 2016.

(Continued)

*Primary Examiner* — David Porta
*Assistant Examiner* — Blake Riddick
(74) *Attorney, Agent, or Firm* — Husch Blackwell LLP

(57) ABSTRACT

A system is provided that includes a security system that protects a secured area, a passive infrared (PIR) detector of the security system that detects intruders within the secured area, a pyroelectric element carried by the PIR detector, the pyroelectric element being tilted downwards towards a floor within the secured area to receive and detect a predominant portion of energy from an area extending outwards from the PIR detector and directly in front of the PIR detector and a relatively small portion of energy from a floor area directly below the PIR detector, and a pivoting door having first and second positions mounted below and directly adjacent the pyroelectric element, the door pivoting upwards to the first position where the relatively small portion of energy is blocked and pivoting downwards where the relatively small portion of energy is transmitted onto the pyroelectric element.

8 Claims, 6 Drawing Sheets

(56) References Cited

U.S. PATENT DOCUMENTS

| | | | | |
|---|---|---|---|---|
| 8,258,478 B2* | 9/2012 | Walters | ............... | G08B 13/193 |
| | | | | 250/342 |
| 2009/0166538 A1* | 7/2009 | Buckley | ............... | G01J 5/0022 |
| | | | | 250/340 |
| 2009/0302220 A1* | 12/2009 | Micko | ................ | G08B 13/191 |
| | | | | 250/338.3 |
| 2010/0141444 A1* | 6/2010 | Brown | ................ | G01J 5/0022 |
| | | | | 340/555 |
| 2010/0237248 A1* | 9/2010 | Walters | ................ | G08B 29/18 |
| | | | | 250/340 |
| 2012/0168629 A1* | 7/2012 | Santos | ................ | G01D 11/26 |
| | | | | 250/353 |
| 2014/0354428 A1 | 12/2014 | Xu | | |

OTHER PUBLICATIONS

INTELLISENSE TM, Dual Technology Motion Sensor K-Band Technology, URL: http://www.sourcesecurity.com/docs/fullspec/dt7550_datasheet.pdf, dated Dec. 31, 2001.

Hayes et al., Unobtrusive assessment of walking speed in the home using inexpensive PIR sensors, Proceedings of the 31st Annual International Conference of the IEEE Engineering in Medicine and Biology Society: Engineering the Future ofBiomedicine, EMBC 2009, IEEE, Sep. 3, 2009, pp. 7248-7251.

* cited by examiner

SMART LOOKDOWN FUNCTION SWITCH DESIGN FOR INTRUSION DETECTORS

FIELD

This application relates to security systems and, more particularly, to intrusion detectors.

BACKGROUND

Systems are known to protect people and assets within secured areas. Such systems are typically based upon the use of one or more sensors that detect threats within a secured area.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the area. Intruders have also been known to injure or kill people living within the area.

In the case of intruders, sensors may be placed in different areas based upon the respective uses of those areas. For example, if people are present during some portions of a normal day and not at other times, then sensors may be placed along a periphery of a space to provide protection while the space is occupied while additional sensors may be placed within an interior of the space and used when the space is not occupied.

In most cases, threat sensors are connected to a local control panel. In the event of a threat detected via one of the sensors, the control panel may sound a local audible alarm. The control panel may also send a signal to a central monitoring station.

While security systems work well, they are sometimes difficult to set up and use, especially when large numbers of sensors and different levels of security are involved. Accordingly, a need exists for better methods of expediting the setup of such systems.

DETAILED DESCRIPTION

Figure 1:
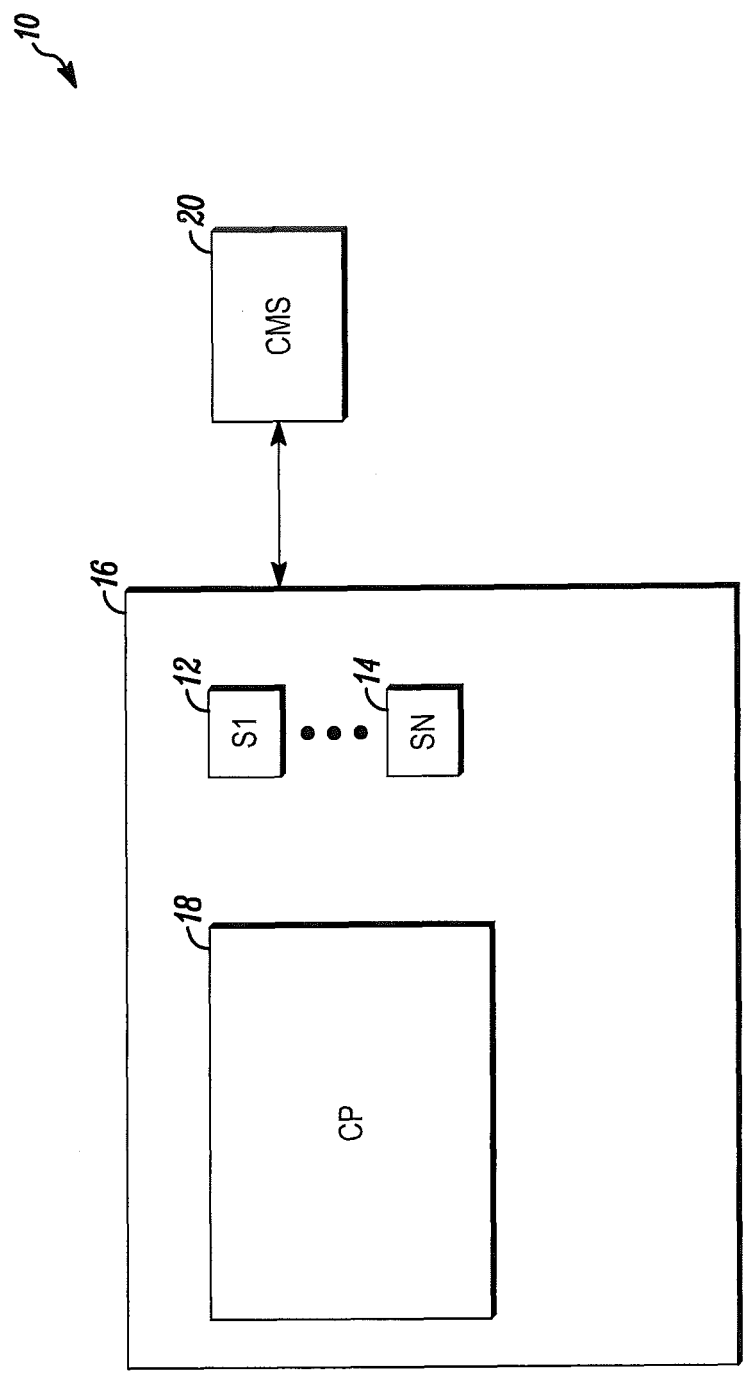
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 is a block diagram of a security system 10 shown generally in accordance with an illustrated embodiment. Included within the system are a number of sensors 12, 14 that detect threats within a secured geographic area 16. Threats within the secured area may be either physical or environmental. For example, a physical threat may be presented in the form of a burglar or other unauthorized intruders. Environmental threats may be presented in the form of fires or gas leaks.

The sensors may be embodied in any of a number of forms. For example, limit switches may be placed on doors and/or windows located around a periphery of the secured area. Alternatively, passive infrared (PIR) detectors may be placed within an interior of the area to detect intruders who have been able to circumvent the sensors located along the periphery.

The sensors may be monitored by a control panel 18 either located within the secured area as shown in FIG. 1 or located remotely. Upon detecting a threat via the sensors, the control panel may compose and send an alarm message to a central monitoring station 20. The central monitoring station may respond by summoning help (e.g., the police, fire department, etc.).

Figure 2:
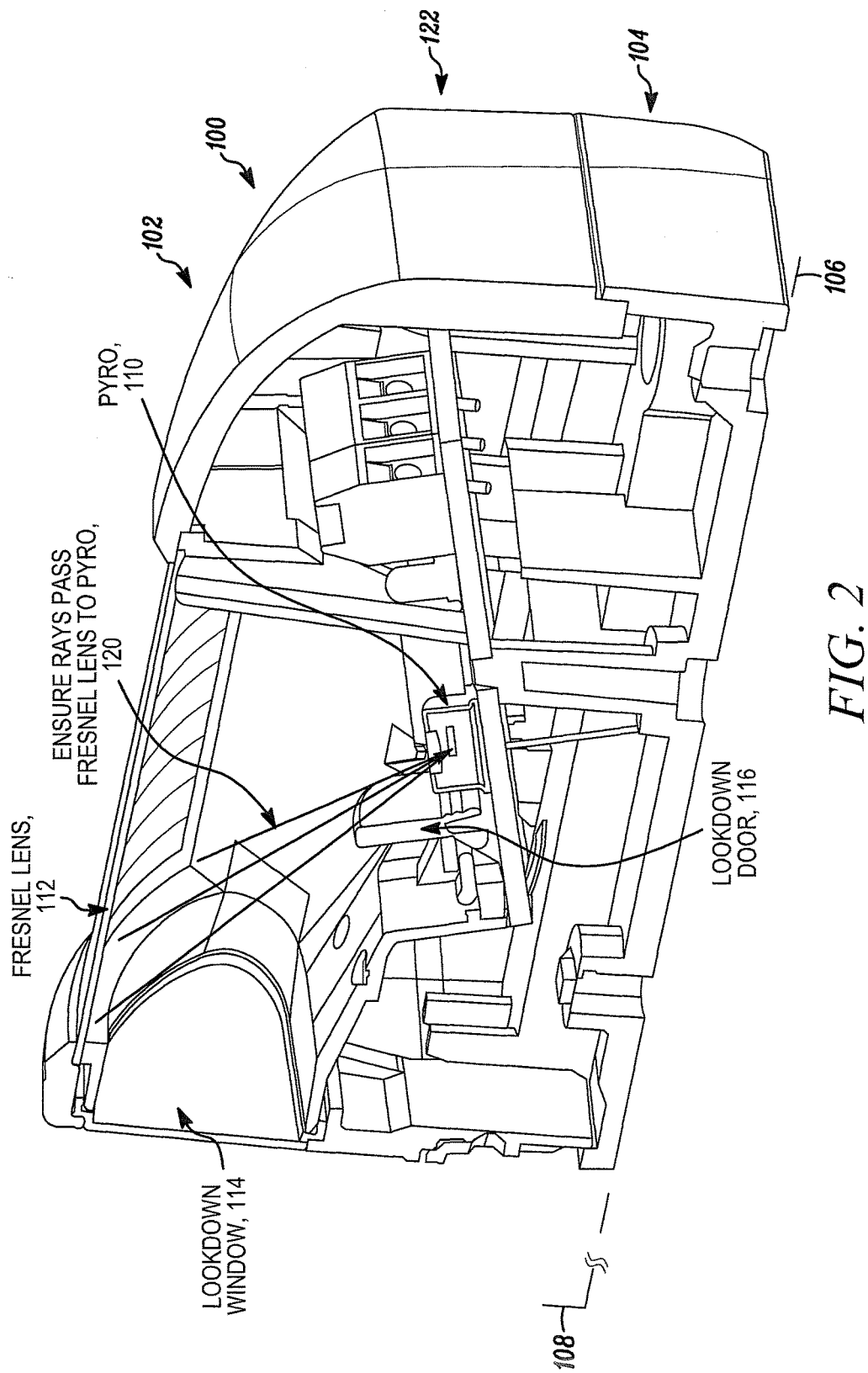
FIG. 2 is a cut-away view of a PIR detector used within the system of FIG. 1.

FIG. 2 is a cut-away side view of a PIR detector 100 that may be used as one of the sensors of FIG. 1. The detector may include a housing 102 made up of a base plate 104 and a cover 122. The detector may be mounted to a wall 106 via the base plate at some known distance above a floor 108 within the secured area.

Included within the PIR detector of FIG. 2 is a pyroelectric detector element 110 that detects infrared energy from intruders. The pyroelectric element may include two halves arranged adjacent one another in a horizontal direction and corresponding electrical circuits that generate an electrical output signal upon detecting an intruder. The output signal is generated via a differential signal received from the pyroelectric element that is generated by the intruder separately activating the two halves of the pyroelectric element.

The pyroelectric element is slightly tilted towards the floor. The slight tilt allows a relatively small portion of the detected infrared energy to be received from the floor directly below the PIR detector. The fact that the tilt is only slightly towards the floor allows most of the detected infrared energy (or a predominant portion thereof) to be received from the area directly in front of the PIR detector.

Interposed between the pyroelectric element and the area in front of the PIR detector is a Fresnel lens 112. The Fresnel lens acts to transmit energy received from in front of the PIR detector onto the pyroelectric element.

The PIR detector also includes a lookdown window 114. The lookdown window allows light from the area directly below the PIR detector (and intruders) to be detected by the tilted pyroelectric element.

Figure 3A:
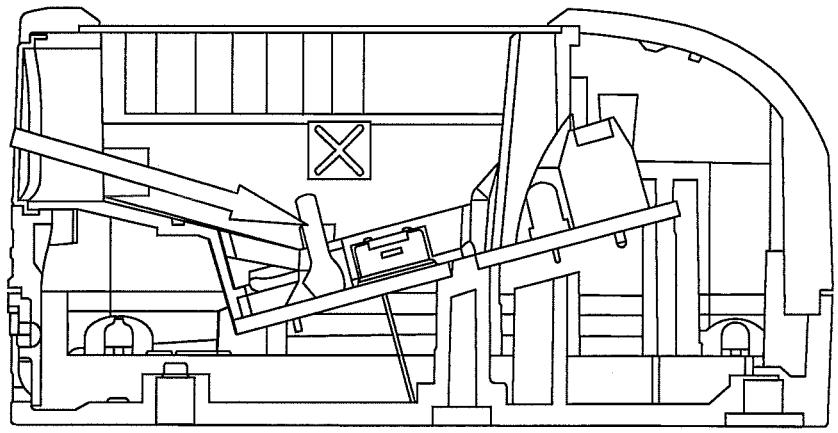
FIGS. 3A-3B depict alternate positions of a lookdown door within the PIR detector of FIG. 2.
Figure 3B:
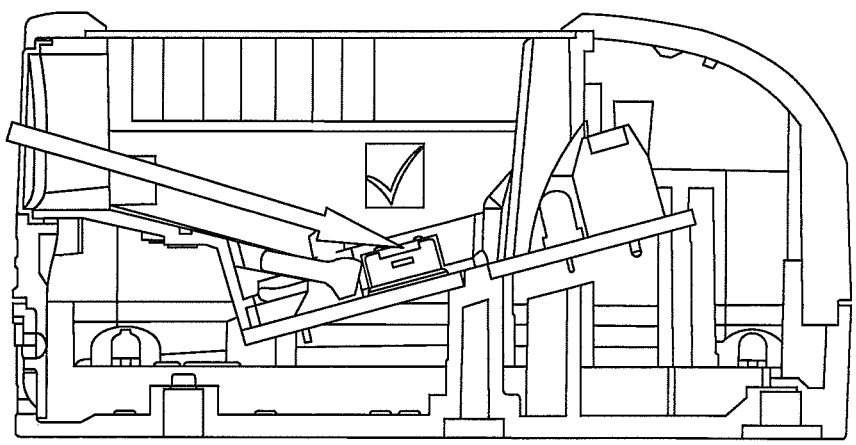

Included within the PIR detector is a lookdown door 116. The lookdown door 116 is moveable between first and second positions. In the first, raised position (shown in FIGS. 2, 3A, 4A, and 5), rays 118 arriving through the lookdown window from the area below the PIR detector are blocked as shown by the X in FIG. 3A. In the second, lowered position (shown in FIGS. 3B and 4B), rays arriving through the lookdown window from the area below the PIR detector are transmitted through (as shown by the check mark in FIG. 3B) and are detected by the pyroelectric element.

In this regard, rays 120 arriving from the area in front of the PIR detector are not affected by the lookdown door or the position of the lookdown door. As shown in FIG. 2, the rays

120 through the Fresnel lens from in front of the PIR detector are always received and detected by the pyroelectric element.

Figure 6:
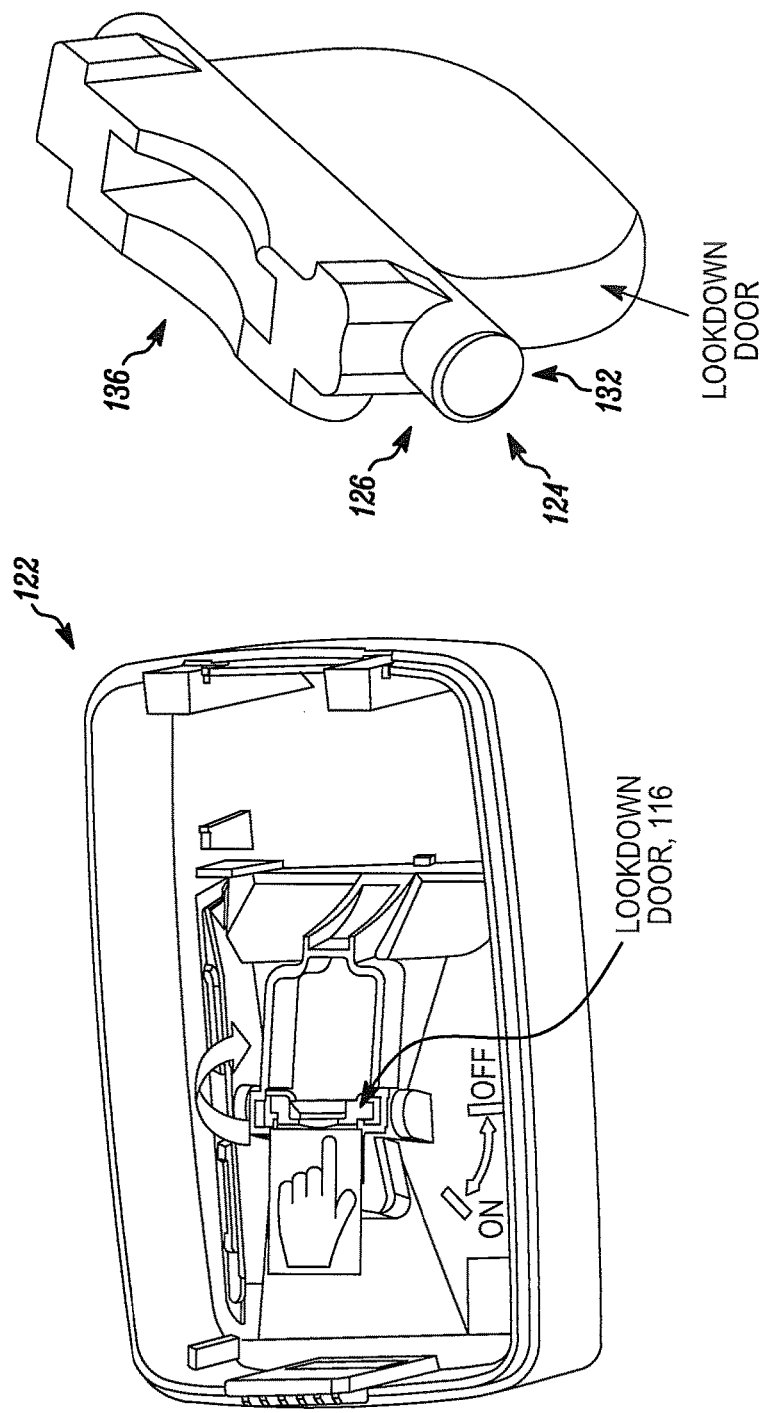
FIG. 6 depicts details of a cover of the PIR detector of FIG. 2.

The cover supports the Fresnel lens, the lookdown window, and the lookdown door. FIG. 6 shows the cover removed from the base plate and the lookdown door. As shown, the lookdown door includes a transverse shaft 124 extending through the lookdown door and extending outwards from opposing sides of the lookdown door. The lookdown door pivots around this transverse shaft.

Figure 4A:
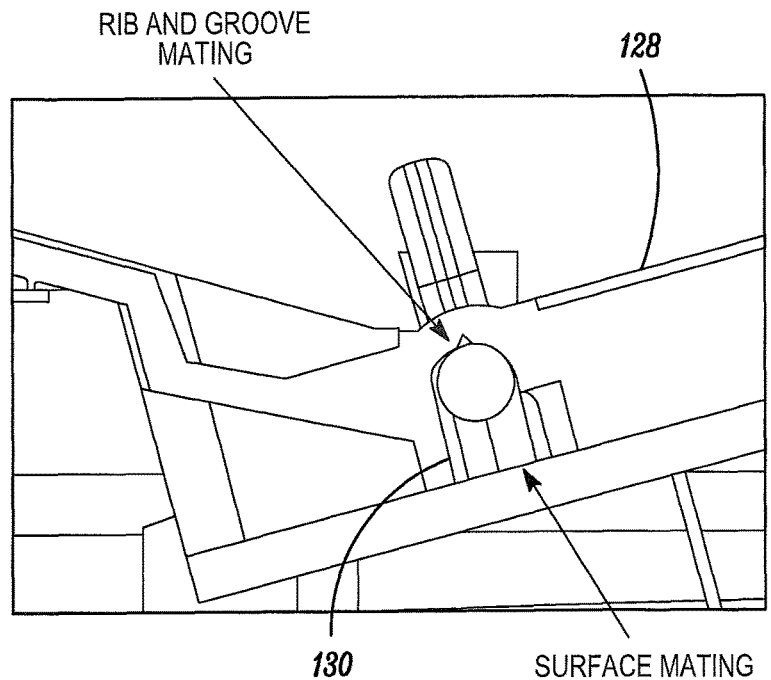
FIGS. 4A-4B depict further details of the lookdown door of FIGS. 3A-3B.
Figure 4B:
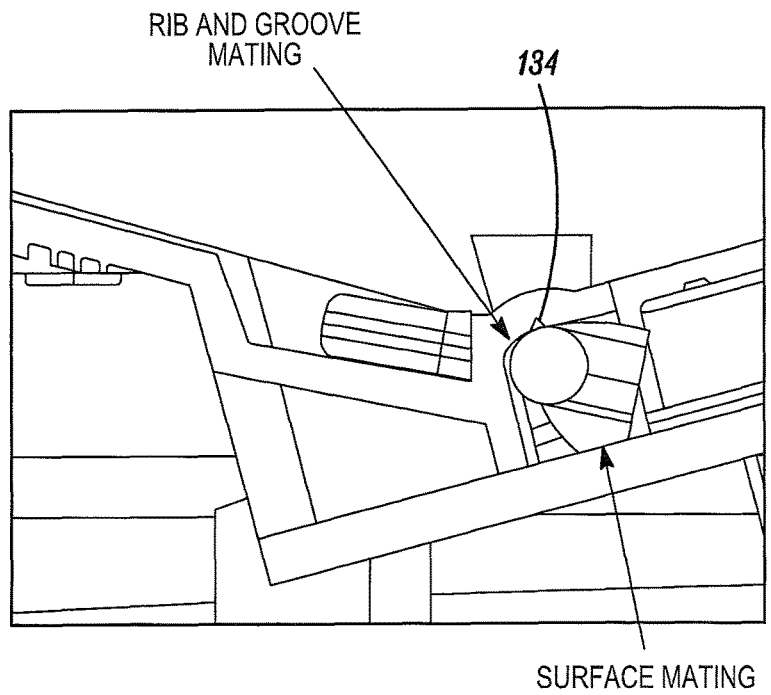
Figure 5:
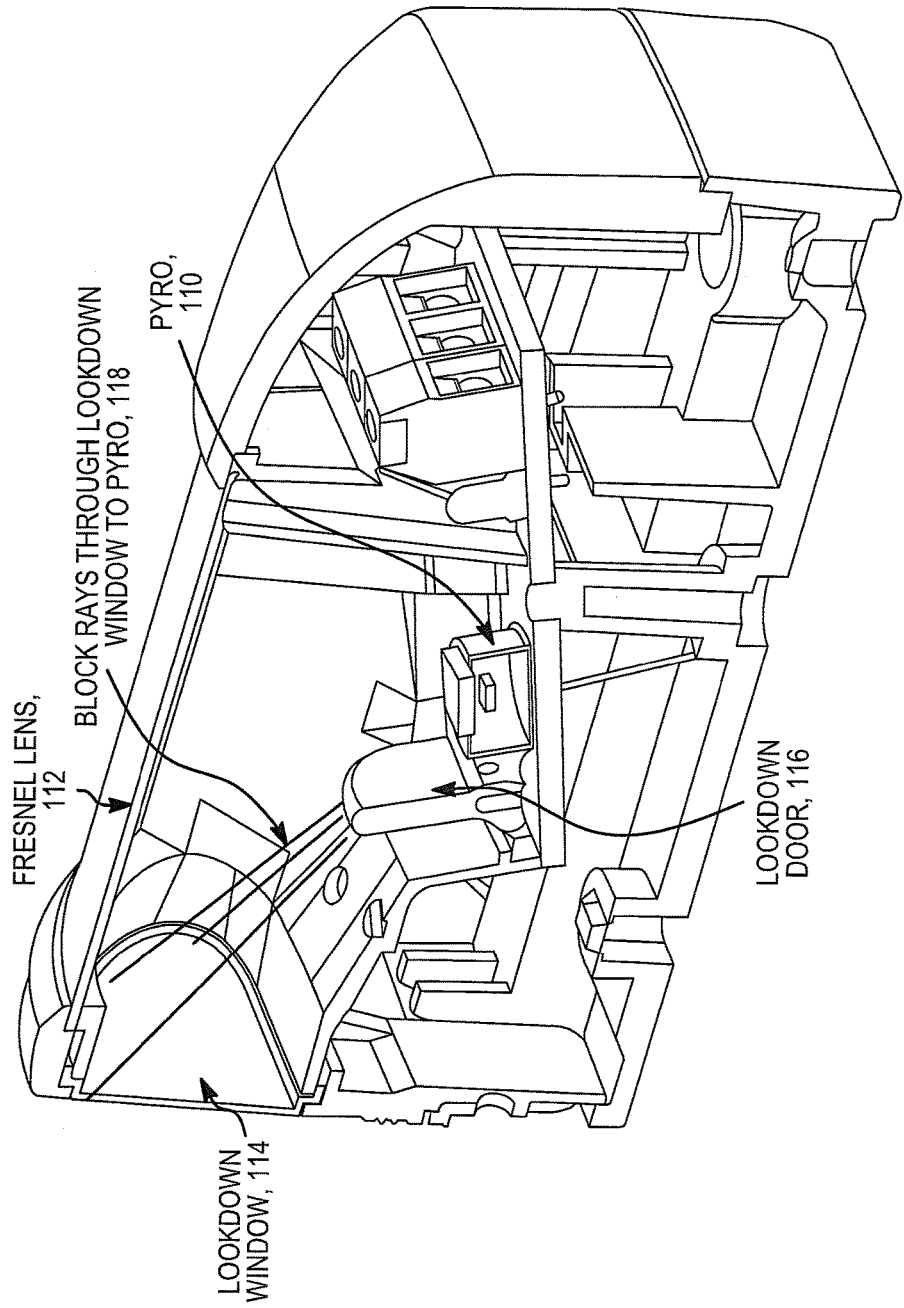
FIG. 5 depicts additional details of the cut-away view of FIG. 2.

As shown in FIGS. 3, 4 and 6 a flange 128 on an inside of the cover extends around an opening for the Fresnel lens. A pair of slots 130 are formed in this flange for support of the lookdown door. Mating surfaces on the lookdown door (FIGS. 4A-4B) engage a corresponding set of mating surfaces on a support of the pyroelectric element in order to maintain the lookdown door within the slots and a ridge within a groove.

Opposing ends 126 of the transverse shaft engage the pair of slots 130. A rib 132 on outside surfaces of the opposing ends engage corresponding grooves 134 within a periphery of the slots to retain the lookdown door in either the first or second position.

The lookdown door is movable without tools between the first and second position using only the fingers of a user as otherwise depicted by the image of the hand superimposed over the cover in FIG. 6. As shown in FIG. 6, the user places his/her forefinger on a base 136 of the lockdown door and pushes away from the lookdown window to retract the lookdown door. The user reverses the process to deploy or otherwise raise the lookdown door. A set of instructions for accomplishing these changes is shown on a back of the cover as depicted in FIG. 6.

In general, some intrusion motion sensors have a lookdown function (e.g., a lookdown window), but in some applications, the lookdown function needs to be disabled. The system shown in FIGS. 1-6 accomplishes this objective and provides a number of additional benefits. First, the system is easy to assembly, operate, and install without any tools. It has a minimum of parts and, therefore, has a competitive cost advantage. In blocking the lookdown function, no parts need to be removed from the unit and stored for potential reuse. In this regard, the lookdown function can be enabled and disabled by rotating a single unique part (i.e., the lookdown door).

The lookdown door has a shape optimized for an inside contour of the cover to substantially block light from the lookdown window, but doesn't affect the rays passing through the Fresnel lens that are detected by the pyroelectric element. Only the lookdown function is disabled when the lookdown door is set to the OFF state.

The assembly of the lookdown door is relatively simple. The user simply presses it into the pair of slots in the cover (often referred to as the "bug guard").

A mating feature, including recessed features on the lookdown door and protruding features on the cover, is provided to avoid inserting the lookdown door backwards.

Tools are unnecessary for use of the lookdown door except that the user must use one finger to pull/push the lookdown door into a proper orientation. The lookdown door can be easily disabled in the same manner as shown in the figures.

The lookdown door uses redundant features to maintain the proper orientation. First, there are small ribs on each side of the lookdown door. The ribs mate with the grooves in the slots of the cover at two different functional positions shown in the drawings so as to make sure that the lookdown door is not positioned improperly. Second, there are two mating surfaces on the lookdown door so that they will separately mate with a PCB board of the pyroelectric element in the two different lookdown door positions.

In the past, there were two alternative methods of disabling the lookdown function. The first method was to use a black thin label to otherwise mask the lookdown window. When enabling the lookdown function, the user would need to fully disassemble the detector to remove the label from the lookdown window and then reassemble the detector.

The second method was to use a rubber sheet or membrane to mask the lookdown window. When enabling the lookdown function, the user would need to disassemble the detector to remove the rubber sheet or membrane from the lookdown window and then reassemble the detector.

These two prior methods have at least two disadvantages. First, they need to fully disassemble the detector in order to remove the label or rubber sheet and then reassemble the detector. Second, installation of the label or rubber sheet is complicated and time consuming.

In general, the PIR detector of FIGS. 1-6 includes a base plate for a passive infrared (PIR) detector adapted for attachment via a rear surface to a wall, a pyroelectric element mounted to a front surface of the base plate, the pyroelectric element being tilted downwards to receive and detect a predominant portion of energy from an area extending outwards and directly in front of the PIR detector and a relatively small portion of energy from an area directly below the PIR detector, a Fresnel lens mounted in front of the pyroelectric element that transmits the predominant portion of energy from the area directly in front of the PIR element onto the pyroelectric element, a lookdown window mounted below the pyroelectric element that transmits the relatively small portion of energy from the area directly below the PIR detector onto the pyroelectric detector, and a pivoting door having first and second positions mounted below the pyroelectric element between the lookdown window and the pyroelectric element, the door pivoting upwards to the first position where the relatively small portion of energy is blocked and pivoting downwards where the relatively small portion of energy is transmitted onto the pyroelectric element.

Alternatively, the system includes a security system that protects a secured area, a passive infrared (PIR) detector of the security system carried by a wall within the secured area, a base plate of the PIR detector adapted for attachment via a rear surface to a wall, a pyroelectric element mounted to a front surface of the base plate, the pyroelectric element being tilted downwards to receive and detect a predominant portion of energy from an area extending outwards from the wall and directly in front of the PIR detector and a relatively small portion of energy from a floor area adjacent the wall directly below the PIR detector and a pivoting door having a first and second positions mounted below and directly adjacent the pyroelectric element, the door pivoting upwards to the first position where the relatively small portion of energy is blocked and pivoting downwards where the relatively small portion of energy is transmitted onto the pyroelectric element.

Alternatively, the system includes a security system that protects a secured area, a passive infrared (PIR) detector of the security system that detects intruders within the secured area, a pyroelectric element carried by the PIR detector, the pyroelectric element being tilted downwards towards a floor within the secured area to receive and detect a predominant portion of energy from an area extending outwards from the PIR detector and directly in front of the PIR detector and a relatively small portion of energy from a floor area directly below the PIR detector, and a pivoting door having first and second positions mounted below and directly adjacent the pyroelectric element, the door pivoting upwards to the first position where the relatively small portion of energy is blocked and pivoting downwards where the relatively small portion of energy is transmitted onto the pyroelectric element.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. An apparatus comprising:
a base plate for a passive infrared (PIR) detector adapted for attachment via a rear surface to a wall;
a pyroelectric element mounted to a front surface of the base plate, wherein the pyroelectric element is tilted downwards to receive and detect a predominant portion of energy from an area extending outwards and directly in front of the PIR detector and a relatively small portion of the energy from an area directly below the PIR detector;
a Fresnel lens mounted in front of the pyroelectric element that transmits the predominant portion of the energy from the area extending outwards and directly in front of the PIR detector onto the pyroelectric element;
a lookdown window mounted below the pyroelectric element that transmits the relatively small portion of the energy from the area directly below the PIR detector onto the pyroelectric element; and
a pivoting door having a first position and a second position mounted below the pyroelectric element between the lookdown window and the pyroelectric element,
wherein the pivoting door pivots upwards to the first position so that the relatively small portion of the energy is blocked and pivots downwards to the second position so that the relatively small portion of the energy is transmitted onto the pyroelectric element,
wherein the Fresnel lens includes a cover that supports the Fresnel lens and the lookdown window,
wherein the pivoting door includes a transverse shaft extending through the pivoting door that is supported by a first flange,
wherein the pivoting door rotates around the transverse shaft,
wherein the cover includes a pair of slots,
wherein each of the pair of slots receives a respective one of opposing ends of the transverse shaft via an interference fit,
wherein a first of the opposing ends of the transverse shaft comprises a rib extending outwards from a side of the transverse shaft, thereby engaging a marginal edge of a first slot of the pair of slots,
wherein the first slot includes a first groove and a second groove extending into the marginal edge of the first slot parallel to the transverse shaft,
wherein the first groove engages the rib to retain the pivoting door in the first position, and
wherein the second groove engages the rib to retain the pivoting door in the second position.

2. The apparatus as in claim 1 wherein the cover is attached to a periphery of the base plate and extends outwards over the pyroelectric element.

3. The apparatus as in claim 2 wherein the cover includes a second flange that extends partially around the Fresnel lens and that supports the pivoting door.

4. An apparatus comprising:
a security system that protects a secured geographic area;
a passive infrared (PIR) detector of the security system carried by a wall within the secured geographic area;
a base plate of the PIR detector adapted for attachment via a rear surface to the wall;
a pyroelectric element mounted to a front surface of the base plate, wherein the pyroelectric element is tilted downwards to receive and detect a predominant portion of energy from an area extending outwards and directly in front of the PIR detector and a relatively small portion of the energy from a floor area adjacent the wall directly below the PIR detector;
a pivoting door having a first position and a second position mounted below and directly adjacent the pyroelectric element, wherein the pivoting door pivots upwards to the first position so that the relatively small portion of the energy is blocked and pivots downwards to the second position so that the relatively small portion of the energy is transmitted onto the pyroelectric element;
a Fresnel lens mounted in front of the pyroelectric element that transmits the predominant portion of the energy from the area extending outwards and directly in front of the PIR detector onto the pyroelectric element; and
a lookdown window mounted below the pyroelectric element,
wherein the pivoting door is interposed between the lookdown window and the pyroelectric element,
wherein the lookdown window transmits the relatively small portion of the energy from the floor area adjacent the wall directly below the PIR detector onto the pyroelectric element,
wherein the Fresnel lens includes a cover that supports the Fresnel lens and the lookdown window,
wherein the pivoting door includes a transverse shaft extending through the pivoting door that is supported by a flange,
wherein the pivoting door rotates around the transverse shaft,
wherein the cover includes a pair of slots,
wherein each of the pair of slots receives a respective one of opposing ends of the transverse shaft via an interference fit,
wherein a first of the opposing ends of the transverse shaft comprises a rib extending outwards from a side of the transverse shaft, thereby engaging a marginal edge of a first slot of the pair of slots,
wherein the first slot includes a first groove and a second groove extending into the marginal edge of the first slot parallel to the transverse shaft,
wherein the first groove engages the rib to retain the pivoting door in the first position, and
wherein the second groove engages the rib to retain the pivoting door in the second position.

5. An apparatus comprising:
a security system that protects a secured geographic area;
a passive infrared (PIR) detector of the security system that detects intruders within the secured geographic area;
a pyroelectric element carried by the PIR detector, wherein the pyroelectric element is tilted downwards towards a floor within the secured geographic area to receive and detect a predominant portion of energy from an area extending outwards and directly in front of the PIR detector and a relatively small portion of the energy from a floor area directly below the PIR detector;
a pivoting door having a first position and a second position mounted below and directly adjacent the pyroelectric element, wherein the pivoting door pivots upwards to the first position so that the relatively small portion of the energy is blocked and pivots downwards to the second position so that the relatively small portion of the energy is transmitted onto the pyroelectric element;
a Fresnel lens mounted in front of the pyroelectric element that transmits the predominant portion of the energy from the area extending outwards and directly in front of the PIR detector onto the pyroelectric element; and
a lookdown window mounted below the pyroelectric element,
wherein the pivoting door is interposed between the lookdown window and the pyroelectric element,
wherein the lookdown window transmits the relatively small portion of the energy from the floor area directly below the PIR detector onto the pyroelectric element,
wherein the Fresnel lens includes a cover that supports the Fresnel lens and the lookdown window,
wherein the pivoting door includes a transverse shaft extending through the pivoting door that is supported by a flange,
wherein the pivoting door rotates around the transverse shaft,
wherein the cover includes a pair of slots,
wherein each of the pair of slots receives a respective one of opposing ends of the transverse shaft via an interference fit,
wherein a first of the opposing ends of the transverse shaft comprises a rib extending outwards from a side of the transverse shaft, thereby engaging a marginal edge of a first slot of the pair of slots,
wherein the first slot includes a first groove and a second groove extending into the marginal edge of the first slot parallel to the transverse shaft,
wherein the first groove engages the rib to retain the pivoting door in the first position, and
wherein the second groove engages the rib to retain the pivoting door in the second position.

6. The apparatus as in claim 5 wherein the PIR detector further comprises a base plate that supports the PIR detector from a wall of the secured geographic area.

7. The apparatus of claim 5 wherein the pivoting door is configured to rotate between the first position and the second position in response to force applied by a user's finger.

8. The apparatus of claim 5 wherein the pivoting door is configured to rotate between the first position and the second position without use of a tool.

\* \* \* \* \*